US011389039B2

(12) United States Patent
Grey et al.

(10) Patent No.: US 11,389,039 B2
(45) Date of Patent: Jul. 19, 2022

(54) VACUUM CLEANER

(71) Applicant: Black & Decker, Inc., New Britain, CT (US)

(72) Inventors: Cavan Grey, Darlington (GB); Derek Muir, Langley Park (GB)

(73) Assignee: Black & Decker, Inc., New Britain, CT (US)

( * ) Notice: Subject to any disclaimer, the term of this patent is extended or adjusted under 35 U.S.C. 154(b) by 466 days.

(21) Appl. No.: 16/594,703

(22) Filed: Oct. 7, 2019

(65) Prior Publication Data

US 2020/0107686 A1     Apr. 9, 2020

(30) Foreign Application Priority Data

Oct. 8, 2018   (GB) ...................................... 1816387

(51) Int. Cl.
| | |
|---|---|
| *B01D 46/00* | (2022.01) |
| *A47L 9/12* | (2006.01) |
| *B01D 46/02* | (2006.01) |
| *B01D 46/24* | (2006.01) |
| *B01D 46/42* | (2006.01) |
| *H01M 10/0525* | (2010.01) |

(52) U.S. Cl.
CPC .............. *A47L 9/127* (2013.01); *B01D 46/02* (2013.01); *B01D 46/2403* (2013.01); *B01D 46/4227* (2013.01); *H01M 10/0525* (2013.01); *B01D 2267/40* (2013.01); *B01D 2279/55* (2013.01); *H01M 2220/30* (2013.01)

(58) Field of Classification Search
CPC .......... A47L 9/127; A47L 11/40; A47L 9/125; A47L 9/1409; B01D 46/02; B01D 46/2403; B01D 46/4227; B01D 2267/40; B01D 2279/55; H01M 10/0525; H01M 2220/30; Y02E 60/10

See application file for complete search history.

(56) References Cited

U.S. PATENT DOCUMENTS

| | | | | |
|---|---|---|---|---|
| 5,005,252 | A | * | 4/1991 | Steiner .................. A47L 7/0009 15/353 |
| 5,248,323 | A | * | 9/1993 | Stevenson ............... A47L 9/125 55/528 |

(Continued)

FOREIGN PATENT DOCUMENTS

| | | |
|---|---|---|
| EP | 1535561 B1 | 2/2008 |
| EP | 1535562 B1 | 12/2008 |

(Continued)

OTHER PUBLICATIONS

The Extended European Search Report dated Jul. 2, 2020.

*Primary Examiner* — Dung H Bui
(74) *Attorney, Agent, or Firm* — John Yun (57) ABSTRACT

A vacuum cleaner comprising: a housing; a motor-fan assembly arranged to generate an airflow between an air inlet and an air outlet; a dirt collection chamber mounted to the housing and having a door; and a filter assembly located within the dirt collection chamber, the filter assembly comprising a coarse filter having a first gripping portion and a fine filter having a second gripping portion, wherein the first and second gripping portions are capable of being gripped by a user, wherein the first gripping portion and the second gripping portion are isolated from an airflow path between the air inlet and the air outlet.

25 Claims, 10 Drawing Sheets

(56) References Cited

U.S. PATENT DOCUMENTS

| | | | |
|---|---|---|---|
| 6,113,663 A * | 9/2000 | Liu | A47L 9/127 96/321 |
| 6,391,073 B1 * | 5/2002 | Koga | B01D 46/0005 55/284 |
| 6,434,785 B1 * | 8/2002 | Vandenbelt | A47L 5/24 15/353 |
| 6,440,191 B1 * | 8/2002 | Berfield | A47L 9/127 55/486 |
| 6,546,592 B1 * | 4/2003 | Cockburn | A47L 9/125 55/488 |
| 6,913,635 B2 * | 7/2005 | Yoo | A47L 9/127 55/482 |
| 2005/0198765 A1 | 9/2005 | Jung et al. | |
| 2007/0033765 A1 * | 2/2007 | Walker | A47L 9/2857 15/344 |
| 2008/0250601 A1 * | 10/2008 | Coburn | A47L 9/20 15/352 |
| 2008/0256744 A1 * | 10/2008 | Rowntreer | A47L 5/24 15/349 |
| 2009/0019663 A1 * | 1/2009 | Rowntree | A47L 5/24 15/347 |
| 2009/0249754 A1 * | 10/2009 | Amirkhanian | B01D 46/88 55/357 |
| 2012/0247340 A1 | 10/2012 | Williams et al. | |
| 2013/0199138 A1 * | 8/2013 | Scott | B01D 46/521 55/482 |
| 2013/0228194 A1 * | 9/2013 | Holsten | B01D 46/2411 15/352 |
| 2018/0084964 A1 * | 3/2018 | Pi | A47L 5/28 |

FOREIGN PATENT DOCUMENTS

| | | |
|---|---|---|
| EP | 2358251 B1 | 8/2016 |
| EP | 2769658 B1 | 11/2018 |
| WO | 2010093072 A1 | 8/2010 |
| WO | 2010102394 A1 | 9/2010 |

* cited by examiner

VACUUM CLEANER

CROSS-REFERENCE TO RELATED APPLICATIONS

This application claims benefit to GB Application No. 1816387.3 filed Oct. 8, 2018.

TECHNICAL FIELD OF THE INVENTION

The present invention relates to a vacuum cleaner.

BACKGROUND OF THE INVENTION

Many people use vacuum cleaners to clean and tidy their homes. There has been a trend for consumers to use cordless vacuum cleaners because they are more convenient than traditional corded vacuum cleaners when cleaning a dirty surface. Some cordless vacuum cleaners are small and light enough to be handheld vacuum cleaners which are also known has "handvacs".

Normally vacuum cleaners are used to pick up dust and debris using a negative pressure. Dust and debris is entrained in an air flow and sucked into the body of the vacuum cleaner wherein the dust and debris are separated from the air flow. The separation means may comprise one or more filters and/or a cyclonic separation device. Once separated from the air flow, the dust and debris are collected in a dirt collection chamber, which is usually emptied by the user into a dustbin when the chamber is full.

Emptying the dirt collection chamber and removing the filters for cleaning usually involves the user having to touch the dirty chamber and filters. This is undesirable for the user. Embodiments of the present invention aim to address these problems.

BRIEF SUMMARY OF THE INVENTION

According to an aspect there is provided a vacuum cleaner comprising: a housing; a motor-fan assembly arranged to generate an airflow between an air inlet and an air outlet; a dirt collection chamber mounted to the housing and having a door; and a filter assembly located within the dirt collection chamber, the filter assembly comprising a coarse filter having a first gripping portion and a fine filter having a second gripping portion, wherein the first and second gripping portions are capable of being gripped by a user, wherein the first gripping portion and the second gripping portion are isolated from an airflow path between the air inlet and the air outlet.

The first gripping portion may be isolated from the airflow path by the door and the second gripping portion may be isolated from the airflow path by the coarse filter.

The first gripping portion may be isolated from the airflow path upstream of the coarse filter by the door and the second gripping portion may be isolated from the airflow path downstream of the coarse filter by the coarse filter.

The fine filter may comprise a collar located at an open end of the fine filter, wherein the collar is configured to push dirt out of the dirt collection chamber as the fine filter is pulled away from the dirt collection chamber.

The coarse filter may comprise a first coupling mechanism configured to removably attach the coarse filter to the fine filter. The first gripping portion may be capable of being gripped by a user's fingers such that the user can pull the coarse filter so as to detach the coarse filter from the fine filter.

The fine filter may comprise a second coupling mechanism configured to removably attach the fine filter to the dirt collection chamber or the housing. The second gripping portion may be capable of being gripped by a user's fingers such that the user can pull the fine filter so as to detach the fine filter from the dirt collection chamber or the housing. The second coupling mechanism may be configured such that the force required to detach the fine filter from the dirt collection chamber is greater than the force required to detach the coarse filter from the fine filter.

The door may comprise a first sealing portion configured to seal the first gripping portion from the airflow path when the door is in a closed configuration.

The first sealing potion may project from an interior face of the door.

The coarse filter may comprise a second sealing portion configured to seal the second gripping portion from the airflow path. The second sealing potion may comprise a recess configured to receive the second gripping portion.

The coarse filter may have an open end and a closed end, wherein the closed end is impermeable by air, the second sealing portion being located at the closed end. The coarse filter may have an open end and an opposite end comprising an opening, wherein the second sealing portion is configured to surround the opening.

The coarse filter may be rigid and the fine filter may be flexible.

The door may be located at the rear of the vacuum cleaner.

The coarse filter and the fine filter may be hollow and shaped to be substantially cylindrical or a truncated cone.

The fine filter may surround at least a portion of the motor.

The coarse filter may surround at least a portion of the fine filter.

The vacuum cleaner may further comprise a battery removably mounted to the housing. The battery may be a lithium ion battery.

The motor-fan assembly may comprise a brushless motor.

The air inlet may be engageable with a floor extension tube.

The housing has a longitudinal axis; the motor has a rotation axis; and the filter assembly has a longitudinal axis, wherein the housing longitudinal axis, the motor rotation axis and the filter longitudinal axis may be substantially parallel.

BRIEF DESCRIPTION OF THE INVENTION

Various other aspects and further embodiments are also described in the following detailed description and in the attached claims with reference to the accompanying drawings, in which:

DETAILED DESCRIPTION OF THE INVENTION

Figure 1:
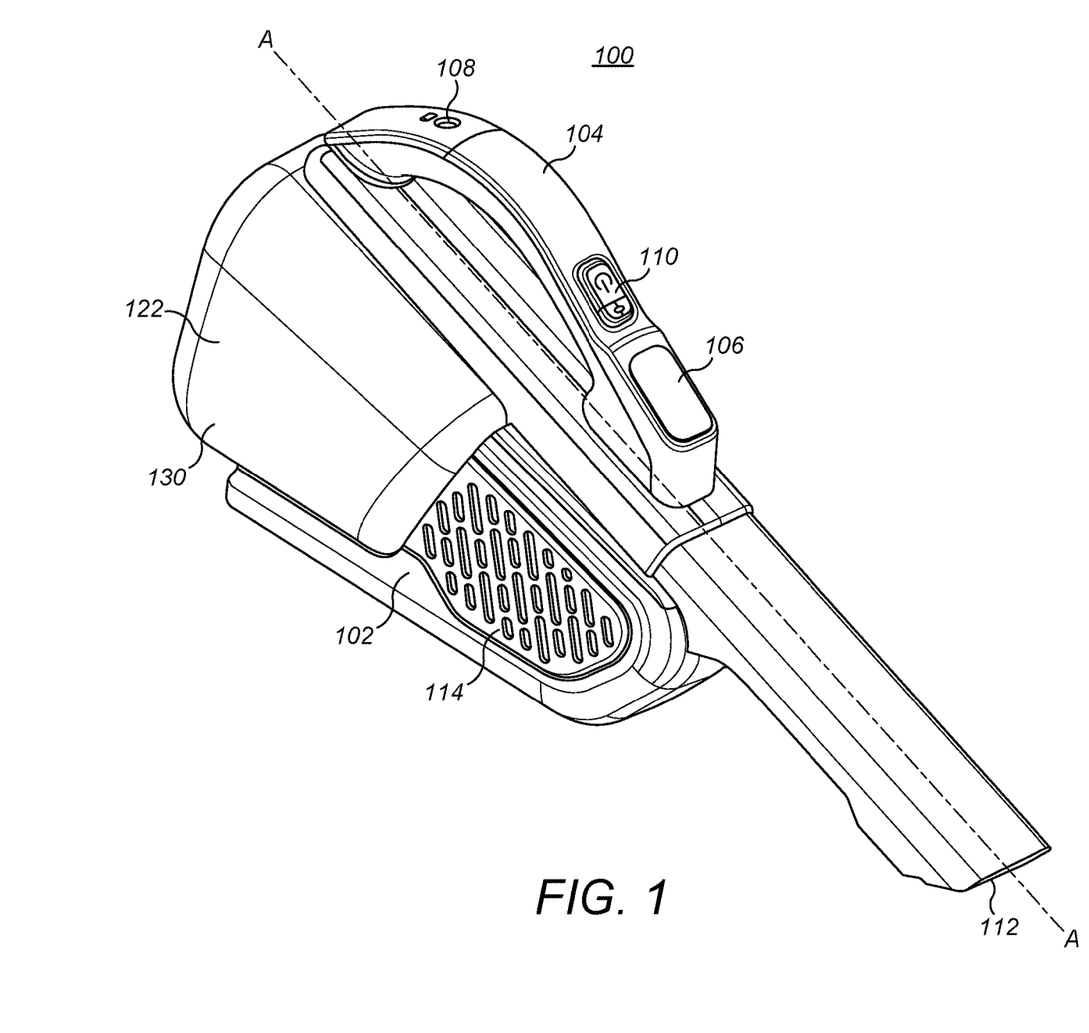
FIG. 1 shows a perspective view of a vacuum cleaner according to an embodiment.

FIG. 1 shows a perspective view of a handheld vacuum cleaner 100. The handheld vacuum cleaner 100 as shown in FIG. 1 is a handheld vacuum cleaner (also known as a "handvac"), but the in other embodiments the handheld vacuum cleaner 100 may be an upright vacuum cleaner, a stickvac, a canister vacuum cleaner or any other type of vacuum cleaner. References to vacuum cleaner 100 hereinafter will be in reference to the handheld vacuum cleaner as shown in the Figures.

The handheld vacuum cleaner unit 100 comprises a housing 102. The housing 102 may comprise a clam shell type construction comprising two halves which are fastened together. The halves of the housing 102 are fastened together with screws but in alternative embodiments any suitable means for fastening the housing together may be used such as glue, clips, bolts and so on. For the purposes of clarity, the fastenings in the housing 102 are not shown.

The housing 102 comprises a handle 104. The handle 104 may be integral with the housing 102 and the user grips the handle 104 when operating the handheld vacuum cleaner 100. Although not shown in the Figures, in some embodiments, the handle 104 is moveably mounted to the housing 102. In this way, the housing 102 comprises a pivot whereby the handle 104 is pivotally mounted to the housing 102. This means that the angle of the handle 104 with respect to the handheld vacuum cleaner 100 can be adjusted. This can make reaching awkward spaces such as under chairs or on top of cupboards easier. Additionally or alternatively, the handle 104 is slideable with respect to the housing 102. Accordingly, the handle 104 is extendable and means that the flexibility of the handheld vacuum cleaner 100 is increased. In some embodiments, the handle 104 is telescopic and is stowed within the housing 102 when not extended.

In some embodiments, the handle 104 comprises an ON/OFF switch 110 for operating the handheld vacuum cleaner 100. The trigger switch 110 is positioned on the top surface of the handle 104 for actuation with, for example, the user's thumb. In other embodiments, the switch 110 may be located on the underside of the handle 104. In this way, the user's index finger can be used to actuate the switch 110. In other embodiments, the switch 110 can be located on any exterior surface of the handheld vacuum cleaner 100.

Figure 2:
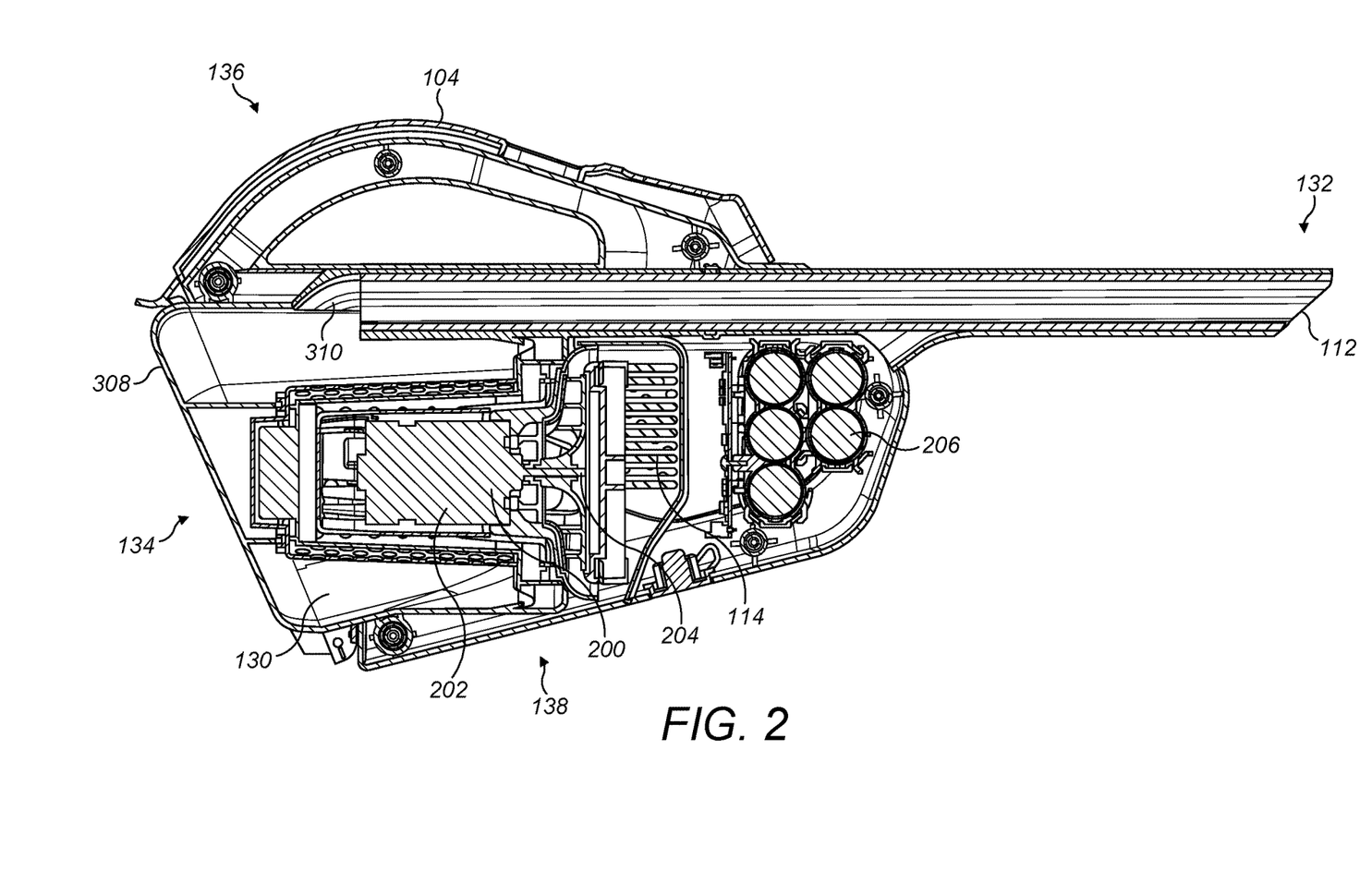
FIG. 2 shows a cross section view of the vacuum cleaner along axis A-A.

In some embodiments, the handle 104 comprises indicators, such as a display 106, for providing information about the handheld vacuum cleaner 100 to the user. For example, the display 106 may indicate to the user the charge level status of a battery 206 (which is best shown in FIG. 2). The display 106 may indicate further properties of the vacuum cleaner such as the filter status (filter blocked/filter cleared) or the suction power level/mode.

The battery 206 is housed in the housing 102. In other embodiments (not shown), the battery may be housed in a battery housing which is releasably mountable to the housing 102. In this way, the battery 206 can be switched with another battery. For example, the bottom of housing 102 may have an opening or recess (that is isolated from the airflow) which can removably receive the battery housing.

The housing 102 may comprise one or more sockets for charging the battery. In the embodiment shown in the figures, the handle comprises a socket 108 for charging the battery.

The handheld vacuum cleaner 100 comprises a generally elongate shape which extends along the longitudinal axis A-A. The housing 102 comprises a dirty air inlet 112 and a clean air outlet 114. An air flow path extends between the dirty air inlet 112 and the clean air outlet 114. The air flow path will be discussed in further detail below. The longitudinal axis of the dirty air inlet is substantially parallel to the longitudinal axis A-A of the handheld vacuum cleaner 100. The clean air outlet 114 can comprise a plurality of openings which are mounted on housing 102.

The openings of the clean air outlet 114 can be directed in a plurality of directions for dissipating the clean air exhaust into the environment. For example, the openings can be orientated to direct the clean air away from the surface to be cleaned. This means that the dirt and debris on the surface to be cleaned is not dislodged by the exhaust clean air and blown away from the dirty air inlet 112.

The handheld vacuum cleaner 100 comprises a motor fan assembly 200 which is best shown in FIG. 2. FIG. 2 shows a cross section view of the handheld vacuum cleaner 100. The motor fan assembly 200 comprises a motor 202 and a fan 204 for generating a negative pressure for sucking up dirt and debris via the dirty air inlet 112. The air inlet 112 can optionally comprise a coupling engageable with a floor extension tube. This means that the handheld vacuum cleaner 100 can allow the user to extend the reach of the handheld vacuum cleaner 100.

In some embodiments, the motor 202 is a brushed d.c. motor with its drive shaft directly coupled to the centrifugal fan 204. The motor's drive shaft has a rotational speed within a range of 15,000 and 40,000 revolutions per minute (rpm). A centrifugal fan with a rotational speed within this range has an outer diameter that is larger than the outer diameter of the motor can in order to have sufficient tip speed to generate the required volumetric flow rate through the separation apparatus discussed hereinafter.

In other embodiments, the motor 202 can be a d.c. motor, an a.c. motor, or an asynchronous multiphase motor controlled by an electronic circuit (not shown). A permanent magnet brushless motor, a switched reluctance motor, a flux switching motor, or other brushless motor type, may have a high rotational speed within a range of 80,000 to 120,000 rpm. When a high speed motor is used, the diameter of the fan can be reduced and yet still generate the required volumetric flow through the separation apparatus because the fan's tip speed is much higher. The fan's outer diameter could be the same as the motor can's outer diameter and could possibly make it less than the motor can's outer diameter if the motor operates at around the upper end of the high rotational speed range. A smaller diameter fan operating within this range of high rotational speeds would typically be an impeller although it may be an axial fan or a centrifugal fan. The outer profile of the smaller fan coupled to the drive shaft of the high rotational speed motor would have a generally cylindrical outer profile. This provides additional flexibility in the layout of the vacuum cleaner. For example, in an embodiment (not shown), a generally cylindrical profile would allow the motor fan assembly to be orientated such that it is substantially perpendicular to the longitudinal axis A-A so that it can be placed between battery and the dirt container 130. This would allow the filter assembly to be smaller and thus increase the dirt container capacity.

The motor fan assembly 200 is electrically connected to a power source. As mentioned above, the power source is a battery 206 comprising a plurality of battery cells. In some embodiments, the battery 206 is a lithium ion battery. In other embodiments, the battery 206 can be any suitable type of battery for use in a handheld vacuum cleaner 100. In other embodiments the handheld vacuum cleaner 100 additionally or alternatively comprises a mains electricity supply (not shown).

The rotation axis of the motor fan assembly 200 is substantially parallel to the longitudinal axis A-A of the housing 102. In some embodiments, rotation axis of the motor fan assembly 200 is coaxial with the longitudinal axis A-A of the housing 102. In other embodiments, rotation axis of the motor fan assembly 200 can be offset from the longitudinal axis of the housing 102.

In some embodiments, the handle 104 is positioned above the motor-fan assembly 200. This makes the handheld vacuum cleaner 100 easier to handle and more ergonomic because the centre of gravity of the handheld vacuum cleaner 100 is close to the handle 104. Accordingly, there is less turning moment about the handle 104 which makes operation of the handheld vacuum cleaner 100 more comfortable. In some embodiments, the battery 206 is located under the handle 104 and slightly forward of the handle. This keeps the centre of gravity of the handle vacuum cleaner 100 close to the handle 104 and slightly forward of the handle 104. This causes the vacuum cleaner to tip slightly forwards and downwards towards the surface to be cleaned which makes operation of the handheld vacuum cleaner 100 more comfortable for the user.

Figure 3:
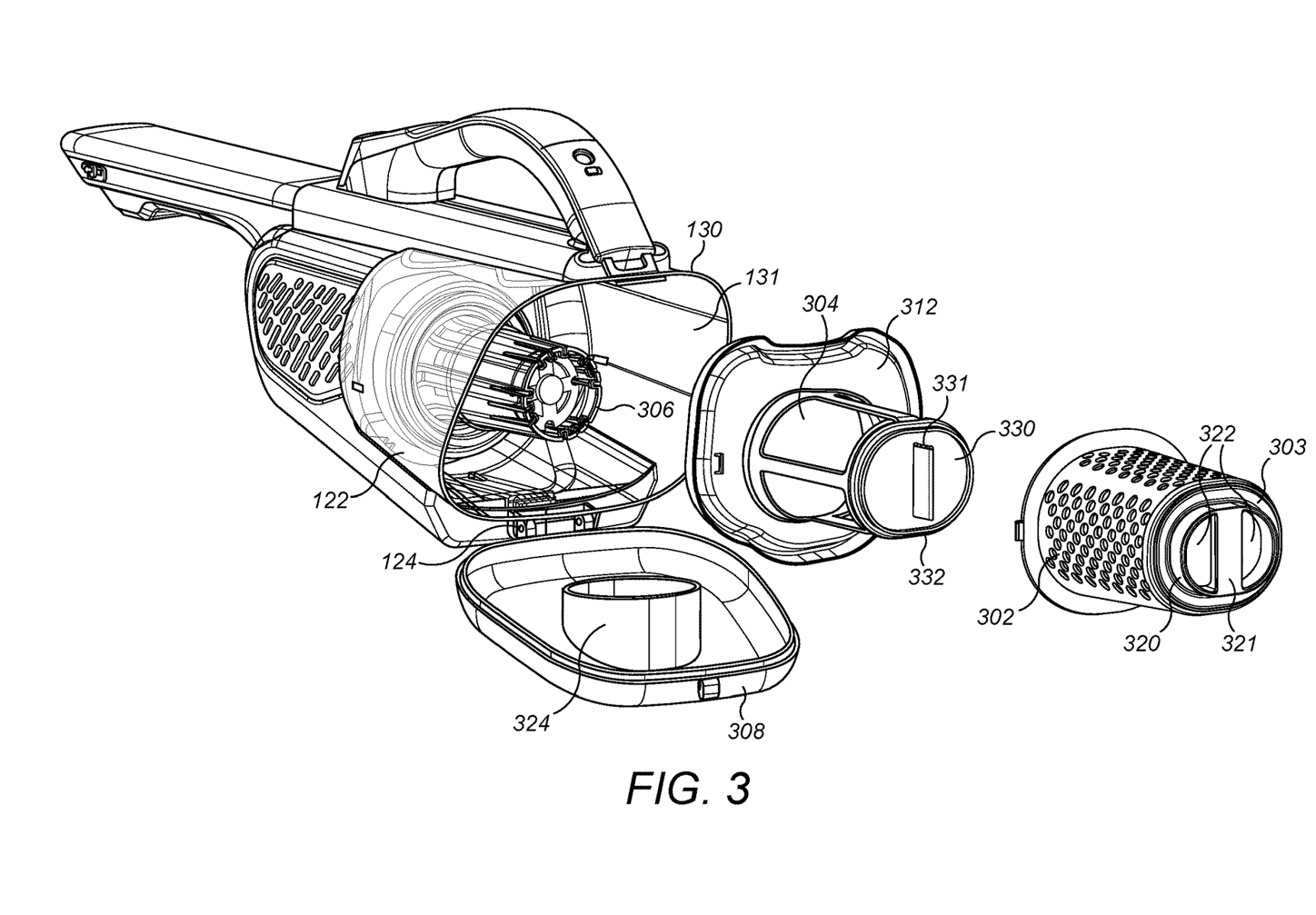
FIG. 3 shows an exploded view of a rear portion of the vacuum cleaner.

Turning now to FIG. 3, there is shown an exploded view of the rear portion of the vacuum cleaner indicating how fine filter 304 is contained within coarse filter 302. Within fine filter 304, there may also be a housing 306 for motor 202. Motor housing 306 may be air-permeable by the presence of a plurality of vents. Thus, clean air cleaned by fine filter 304 may enter housing 306 via the vents. The vents may run along length of the motor housing and towards the axial inlet of the fan 204 (see FIG. 2). This allows the fan 204 to draw clean air to its inlet and allow clean air to pass over to motor to provide a cooling air flow for the motor. The clean air exists the motor housing 306 and enters the axial inlet of the fan 306. The fan 306 directs the clean air back to atmosphere via clean air outlet vents 114. Since the clean air from the filter is drawn over the motor before it encounters the fan, a beneficial side-effect of cooling the motor with air from the filter is also provided. In some conventional vacuum cleaners, the motor is cooled with air expelled by the fan and so the outflow of air from the fan would have to be re-routed in order to pass over the motor. This would require the flow of air to change direction, thereby introducing aerodynamic resistance into the airflow and reducing the overall efficiency of the vacuum cleaner. In contrast, the motor, fan and filter arrangement of this embodiment does not require the air expelled by the fan to be re-routed, and since the motor is contained within the filter, it makes efficient use of space and is therefore particularly suitable for use in a compact or hand-holdable vacuum cleaner. In alternative embodiments, the motor 202 may be located in housing 102 rather than being surrounded by the clean filter 304.

A dirt container 130 is mounted on the housing 102. The dirt container 130 is arranged to receive dirt or debris which is separated from the dirty air flow received from the dirty air inlet 112 during operation.

The dirt container 130 comprises an external wall 122 which forms part of the external surface of the handheld vacuum cleaner 100. In some embodiments, the dirt container 130 may be releasably mountable to the housing 102. In other embodiments, the dirt container 130 may be non-removable from the housing 102.

The dirt container 130 comprises a releasable door or lid 308 for emptying the dirt container 130. As shown in FIG. 3, the door 308 is hinged on the dirt container 130. In this way, the door 308 is coupled to the dirt container 130 with a pivot 124. The door 308 can pivot with respect to an opening 131 in the dirt container 130. This means that the door 308 can be moved from a secured closed position to an open position. In the open position, the dirt container 130 is emptiable in a dustbin or other receptacle.

Figure 5:
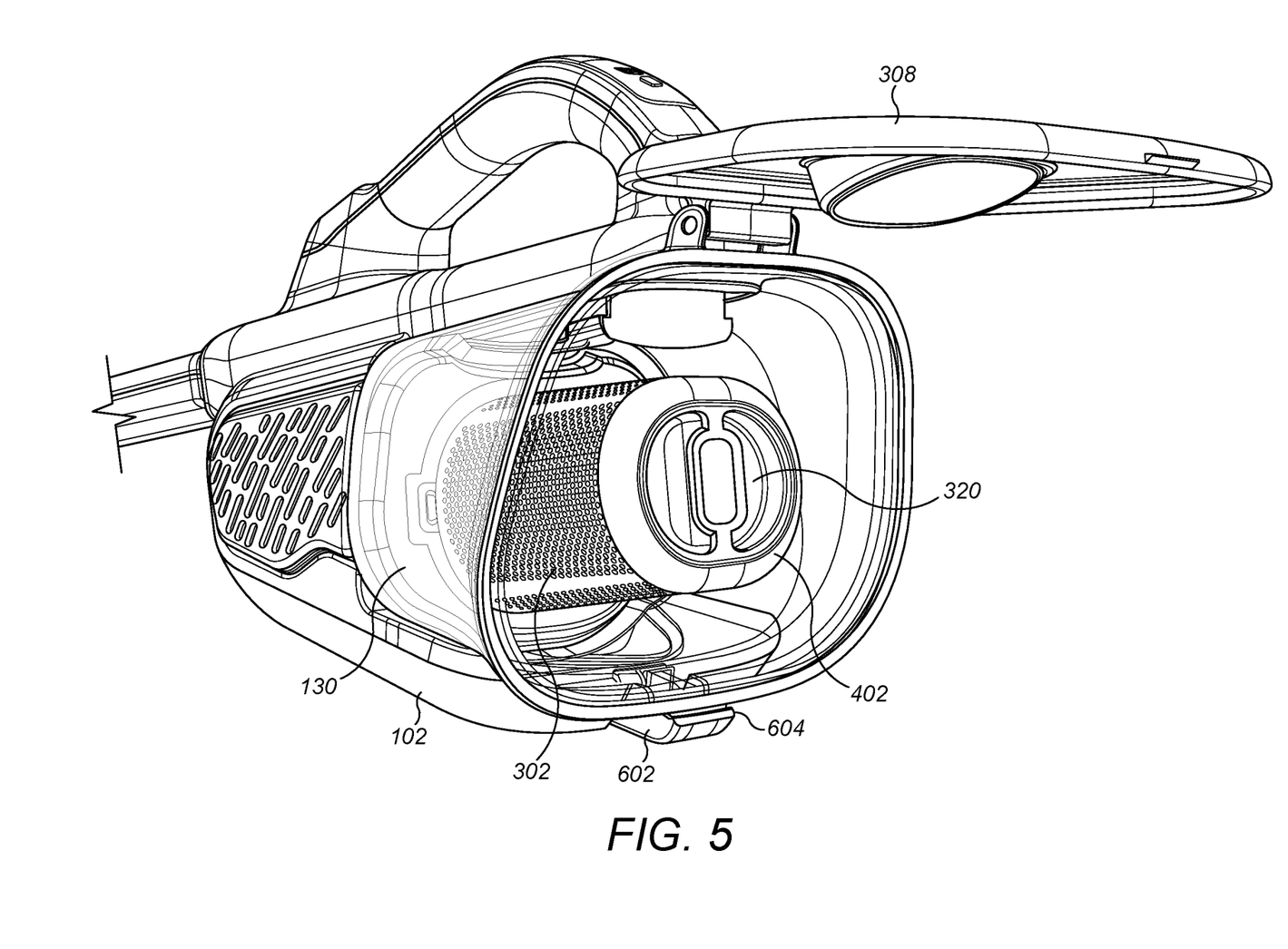
FIG. 5 shows a rear perspective view of a vacuum cleaner according to another embodiment.

The door 308 can be secured to the dirt container 130 with a catch mechanism. In some embodiments the catch is a living hinge with a hook portion 412 which is integral with the door 308 and arranged to couple with a reciprocal recess 414. Alternatively, a catch mechanism can be used such as the arrangement shown in FIG. 5. The catch mechanism can comprise a spring biased lever 602 which is releasable when the user depresses one end of the lever 602 and a hook portion 604 lifts up from the door 308. The lever 602 may be secured to the housing 102 (as shown in FIG. 5) or the dirt container 130. In other embodiments, any other suitable mechanism can be used for selectively releasing the door 308 from the dirt container 130. For example, any arrangement of clips, clamps, hooks, latches, catches etc can be used.

The door 308 and/or the perimeter of the opening 131 may comprise a seal (not shown) around its periphery. The seal can be made from rubber, silicone or any other suitable material for sealing the surfaces. This provides an air tight seal between the door and the dust collector 130 when the door is in the closed position. Alternatively, the door 308 is pressed firmly against the dust collector 130 when the door is in the closed position to create a seal therebetween.

In some embodiments, at least a portion of the dirt container 130 is translucent or transparent so that the user can see the status of the dirt container 130. This makes it easier for the user to know when to empty the dirt container 130. In some embodiments, the entire dirt container 130 is translucent or transparent.

In other embodiments, the dirt container 130 is releasably removeable from the housing 102 such that the dirt container 130 can be completely removed from the housing 102. This means that the dirt container 130 can be removed and washed separately from the handheld vacuum cleaner 100. For example, this allows the user to wash the dirt container 130 under a tap or in a dishwasher. The dirt container 130 may be slidably mountable on the housing 102 or have a press-fit mounting or have any other suitable mechanism for removably securing it to the housing 102.

The handheld vacuum cleaner 100 inherently has a directionality in normal use. In this way, the "front" 132 of the hand handheld vacuum cleaner 100 is at the end corresponding to the dirty air inlet 112. Likewise, the "rear" 134 of the handheld vacuum cleaner 100 is the end of the handheld vacuum cleaner 100 corresponding to the end with the door 308. Accordingly, the handheld vacuum cleaner 100 has a top side 136 and a bottom side 138

The dirt container 130 comprises a container air inlet 310 which is in fluid communication with the dirty air inlet 112. The container air inlet 310 receives the dirty air from the dirty air inlet 112 and guides the air flow into the dirt container 130. In some embodiments, the container air inlet 310 may be tangential to the inner wall of the dirt container 130 to create a cyclonic air flow or swirling air flow around the coarse filter 302. The dirt container 130 comprises a container air outlet in fluid communication with the fan 204.

Actuation of the electrical on/off switch 110 causes the motor 202 to rotate the fan 204, which drives air out of clean air outlets 114. This in turn creates a suction which draws dirty air through the dirty air inlet 112 where it is introduced into the dirt container 130 through the container air inlet 310. From inlet 310, the dirty air passes over the outer surface of the coarse filter 302, and larger particles of debris are deposited in the collection chamber 130. Partially cleaned air then passes through the holes in the coarse filter 302 and passes through the fine filter medium of the fine filter 304, where the filtered air then reaches the motor housing 306. The clean air passes over (and/or through) the motor 202 to cool it. The air exits the dirt container 130 via the container air outlet and enters the axial intake of the fan 204. The air is expelled radially from the fan 204 and out of the outlets 114.

In order to clean or replace the coarse and fine filters 302 and 304, the door 308 is opened and pivots outwards about hinge 124. Debris can then be emptied from the collection chamber 130. The coarse filter 302 and the fine filter 304 can be removed for cleaning from the collection chamber 130.

The coarse filter 302 comprises a gripping portion 320, which the user can grip with their fingers to pull the coarse filter 302 out of the dirt container 130. The gripping portion 320 may comprise a raised part 321, which projects from a recess 322. The raised part 321 and the recess 322 may be sized so that the tips of the user's index finger and thumb can be inserted into the recesses 322 so that the raised part 321 can be gripped. The gripping portion 320 is isolated from the dirty air flow so that dirty air and dirt collected within the dirt container 130 cannot come into contact with the gripping portion 320. This means that when the user wishes to remove the coarse filter 302 from the vacuum cleaner, the gripping portion 320 is clean and so the user does not have to touch any dirty parts of the coarse filter 302.

The gripping portion 320 may be isolated or sealed from the dirty air by the door 308. In the embodiment shown in FIGS. 3 and 4, the door 308 comprises a wall 324 which projects from the inside surface of door 308 and is shaped to surround the gripping portion 320 so as to isolate it when the door 308 is closed. The wall 324 is sized so that, when the door 308 is closed, the portion of the door 308 that is enclosed by the wall 324 receives the gripping portion 320 therein and the top of the wall 324 abuts against a closed end 303 of the coarse filter 302. This isolates the gripping portion 320 from the dirty air flow and the dirt collected within the dirt container 130. In an alternative embodiment (not shown), the wall 324 may project from the closed end 303 of the coarse filter 302 (instead of the inside surface of the door 308) so that when the door 308 is closed the inside surface of the door 308 abuts against the end of the wall opposite the coarse filter 302 so as to seal the gripping portion 320 from the dirty air flow.

In an alternative embodiment, the gripping portion 320 can be sealed from the dirty airflow by a rib and groove arrangement. The end of the coarse filter 302 may comprise a groove that surrounds the gripping portion. The door 308 may comprise a corresponding rib that engages with the groove when the door 308 is closed. This provides a seal around the gripping portion 320 from the dirty air flow and the collected dirt within the dirt container 130. In an alternative arrangement, the rib could be formed at the end of the coarse filter 302 and the groove on the could be formed on the door 308.

The fine filter 304 also comprises a gripping portion 330, which the user can grip with their fingers to pull the fine filter 304 out of the dirt container 130 after first removing the coarse filter 302. The gripping portion 330 may comprise a raised part 331, which projects from the closed end of the fine filter 304. The closed end of the fine filter 304 may be rigid and impermeable by air. The raised part 331 may be sized so that it can be gripped by the index finger and thumb of the user. The gripping portion 330 is isolated from the partially cleaned, but still dirty, air flow between the coarse filter 302 and the fine filter 304. The gripping portion 330 is isolated so that the dirty air and dirt filtered by the fine filter 304 cannot come into contact with the gripping portion 330. This means that when the user wishes to remove the fine filter 304 from the vacuum cleaner, the gripping portion 330 is clean and so the user does not have to touch any dirty parts.

Figure 4:
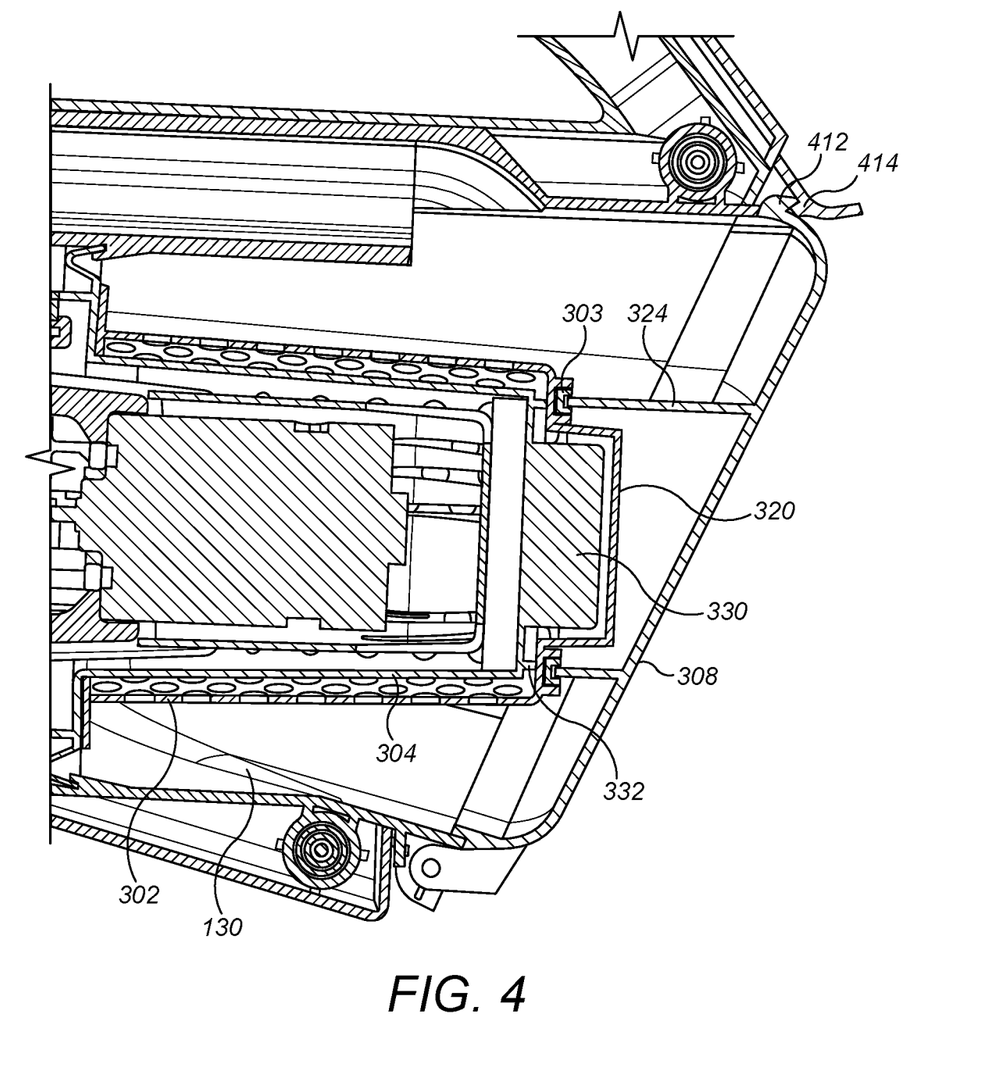
FIG. 4 shows a cross section view of a portion of the vacuum cleaner.

The gripping portion 330 may be isolated or sealed from the dirty air by the coarse filter 302. As shown in FIG. 4, the gripping portion 330 is received within the raised part 321 of the coarse filter. As shown in FIGS. 3 and 4, the closed end of the fine filter 304 comprises a rib 332 which abuts against the inside surface of the closed end 303 of coarse filter 302. This isolates the gripping portion 330 of the fine filter 304 from the dirty air flow and from any dirt separated by the fine filter 304. In an alternative embodiment (not shown), inside surface of the closed end 303 of coarse filter 302 may be provided with a rib that abuts against the closed end of the fine filter 304 so as to surround and isolate the gripping portion 330.

Figure 6:
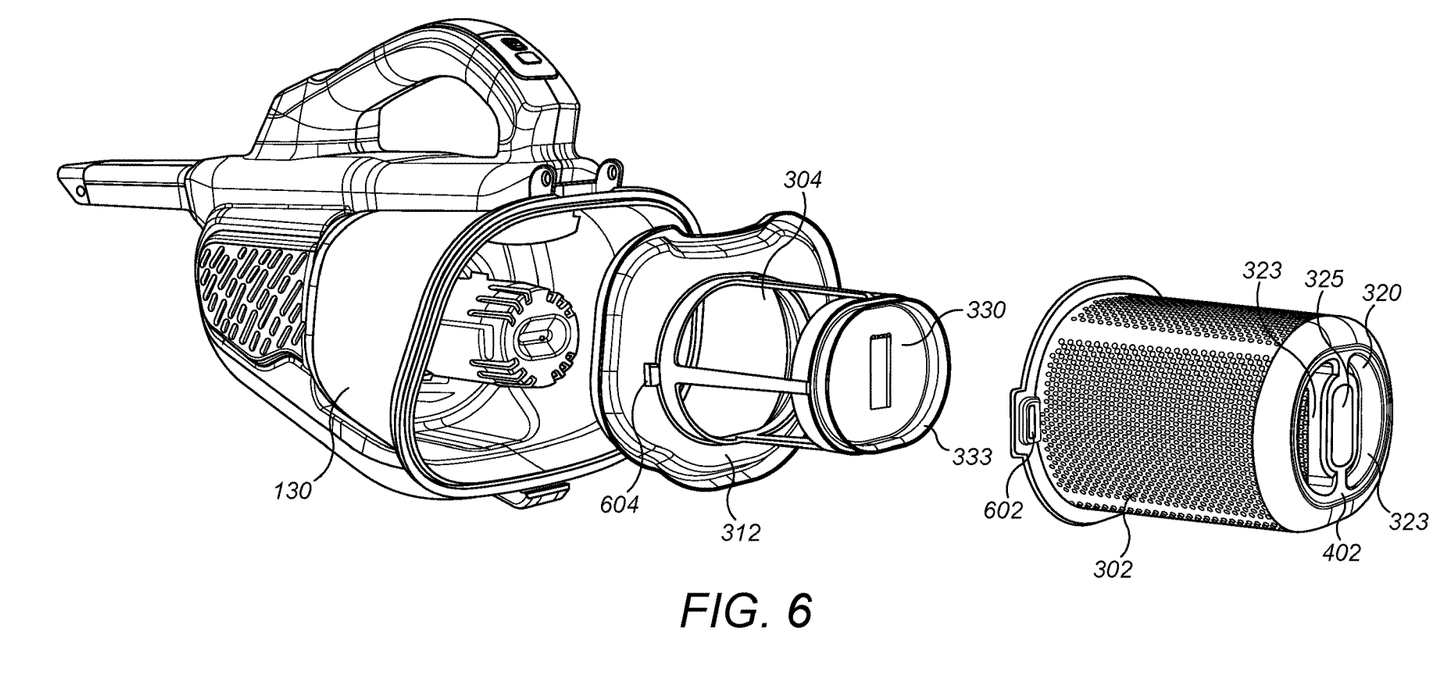
FIG. 6 shows an exploded view of a rear portion of the vacuum cleaner.
Figure 7:
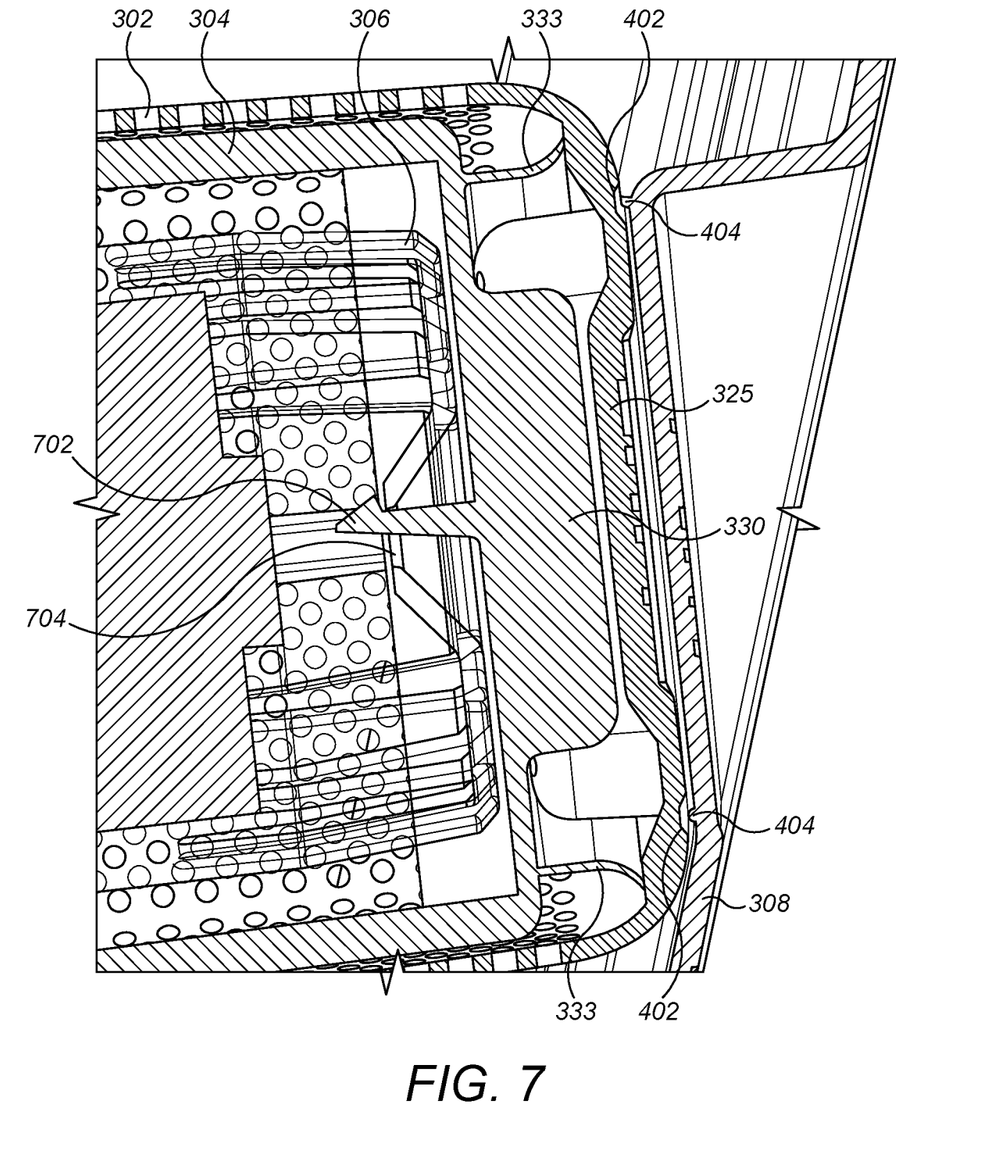
FIG. 7 shows a cross section view of a portion of the vacuum cleaner.

In another embodiment, as shown in FIGS. 5, 6 and 7, instead of recesses 322, the gripping portion may comprise openings 323. The openings 323 are sized to receive the fingers of a user so that the user can grip a knob 325 between the openings to pull the coarse filter 302 out of the dirt container 120. The end of the coarse filter 302 comprises a groove 402 that surrounds the gripping portion 320. The door 308 comprises a corresponding rib 404 that engages with the groove 402 when the door 308 is closed. This provides a seal around the gripping portion 320 from the dirty air flow upstream of the coarse filter 302 and the dirt collected in the dirt container 130. In an alternative arrangement (not shown), the rib could be formed at the end of the coarse filter 302 and the groove on the could be formed on the door 308.

As shown in FIGS. 6 and 7, the fine filter 304 comprises a flange 333 that surrounds the fine filter gripping portion 330. As shown in FIG. 7, the end of the flange 333 abuts against the inside surface of the gripping portion end of the coarse filter 302. The flange 333 thus seals the fine filter gripping portion 330 from the airflow downstream of the coarse filter 302. The flange 330 also surrounds the openings 323 to seal them from the airflow downstream of the coarse filter 302. Since the door 308 seals the openings 323 from the airflow upstream of the coarse filter 302, the fine filter gripping portion 330 is also sealed from the airflow upstream of the coarse filter 302 by the door 308. Thus, the fine filter gripping portion 330 is sealed from the dirty air flow.

Figure 8:
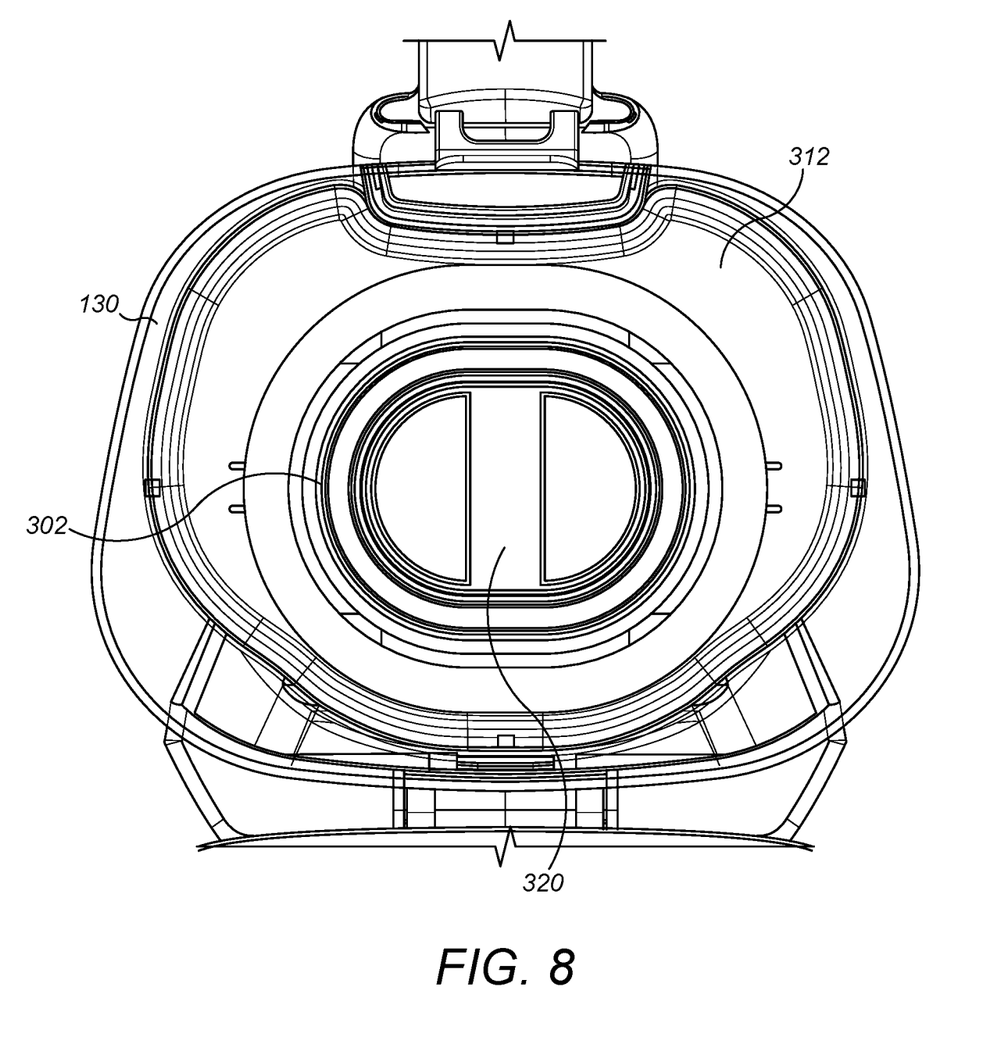
FIG. 8 shows a rear view of the vacuum cleaner with a door in the open configuration.

The fine filter 304 may comprise a collar 312 at its open end. The collar 312 may project outwardly from the opening and towards the walls of the dirt container 130. The collar 312 may be rigid. The collar 312 may be shaped so that the outer edges of the collar 312 contact the inner walls of the dirt container 130, as shown in FIG. 8. As the user pulls the fine filter 304 out of the dirt container 130 using the clean gripping portion 330, the collar 312 pushes out any dirt within the dirt container 130. Thus, the user is able to remove dirt that is lodged within the dirt container 130 without having to insert their fingers inside the dirt container 130 and touch the dirt to pull it out. Thus, the user is able to remove the coarse filter and the fine filter and empty the dirt container without having to touch any dirt or dirty parts of the vacuum cleaner.

Figure 9:
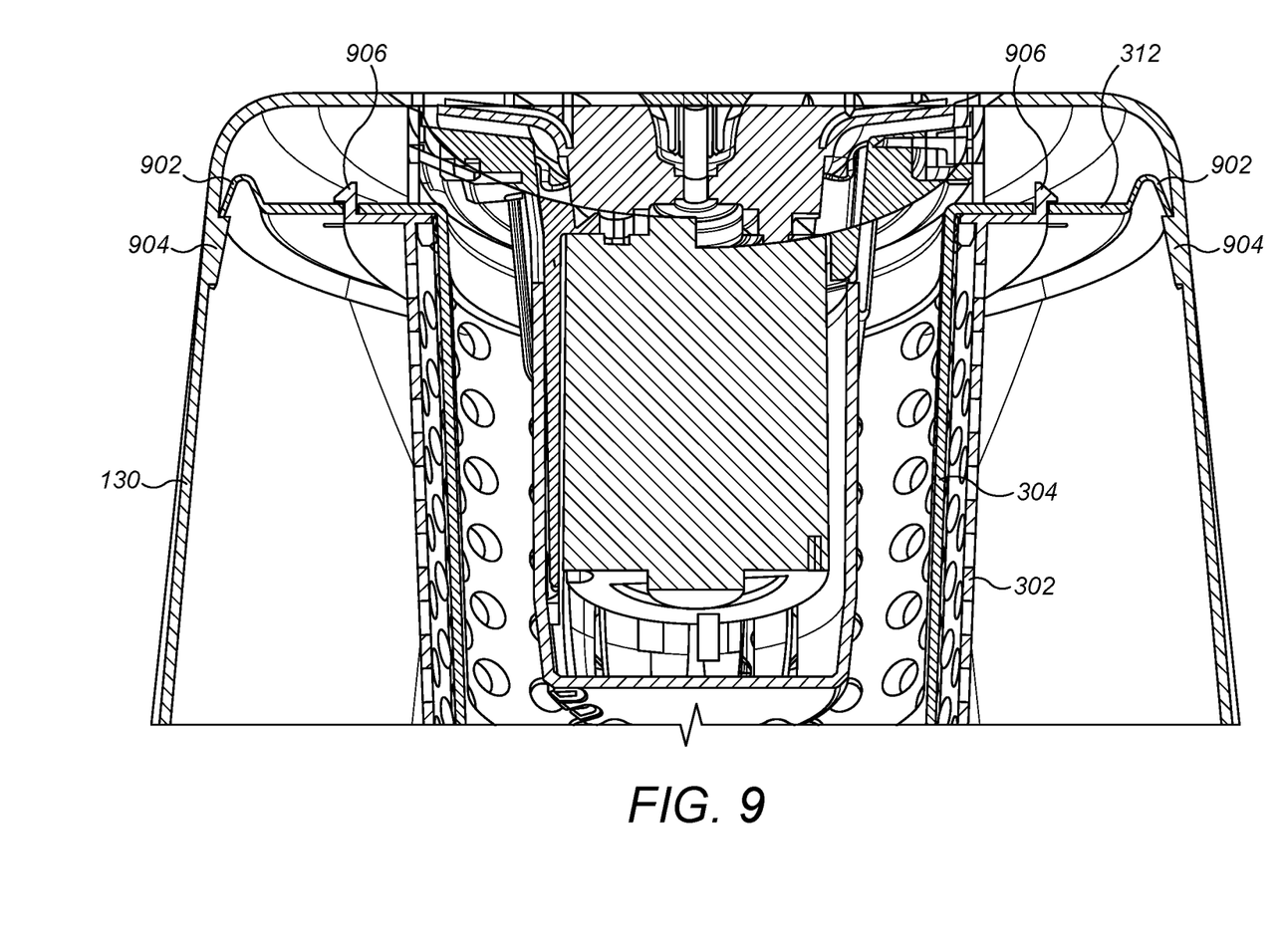
FIG. 9 shows a cross section view of another portion of the vacuum cleaner.

The fine filter may comprise a coupling mechanism that allows it to be removably coupled to the dirt container or housing. FIG. 9 shows one example of such a coupling mechanism. As shown, the collar 312 of the fine filter 304 comprises a plurality of resilient clips 902 which abut against protrusions 904 in the inner surface of the dirt container 130 to retain the fine filter within the container. Another example of the fine filter coupling mechanism is shown in FIG. 7. As shown, the fine filer 304 comprises a clip 702 that is moulded as part of the filter 304. The motor housing 306, which can be secured to the dirt container 130 or the housing 102, comprises a slot 704 that can receive the clip 702 to hold the fine filter 304. Any other suitable mechanism to removably retain the fine filter 304 within the dirt container 130 may be used. For example, any arrangement of clips, clamps, hooks, latches, catches etc can be used.

The coarse filter 302 may comprise a coupling mechanism that allows it to be removably coupled to the fine filter 304 or the dirt container 130. An example of such a mechanism is shown in FIG. 9. The coarse filter 302 comprises a plurality of clips 906 which can engage with corresponding slots in the collar 312 of the fine filter. In another example as shown in FIG. 6, the coarse filter may comprise a plurality slots 602 which can receive corresponding clips 604 on the collar 312 of the fine filter.

The coupling mechanism of the coarse filter 302 may be looser than the coupling mechanism of the fine filter 304 such that when the user pulls the coarse filter 302 out of the dirt container 130, the coarse filter 302 easily detaches from the fine filter 304, with the fine filter 304 remaining held within the dirt container 130. The user can then separately pull out the fine filter 304. If the fine filter remained attached to the coarse filter when the coarse filter is pulled out, the user would have to touch a dirty part of the fine filter (e.g., the collar) in order to separate it from the coarse filter. Thus, by having the coarse filter 302 loosely held within the dirt container and the fine filter 304 more strongly held, the coarse filter is always removed separately to fine filter, which then exposes the clean gripping portion 330 of the fine filter 304, thus allowing the user to cleanly remove the fine filter 304.

Figure 10:
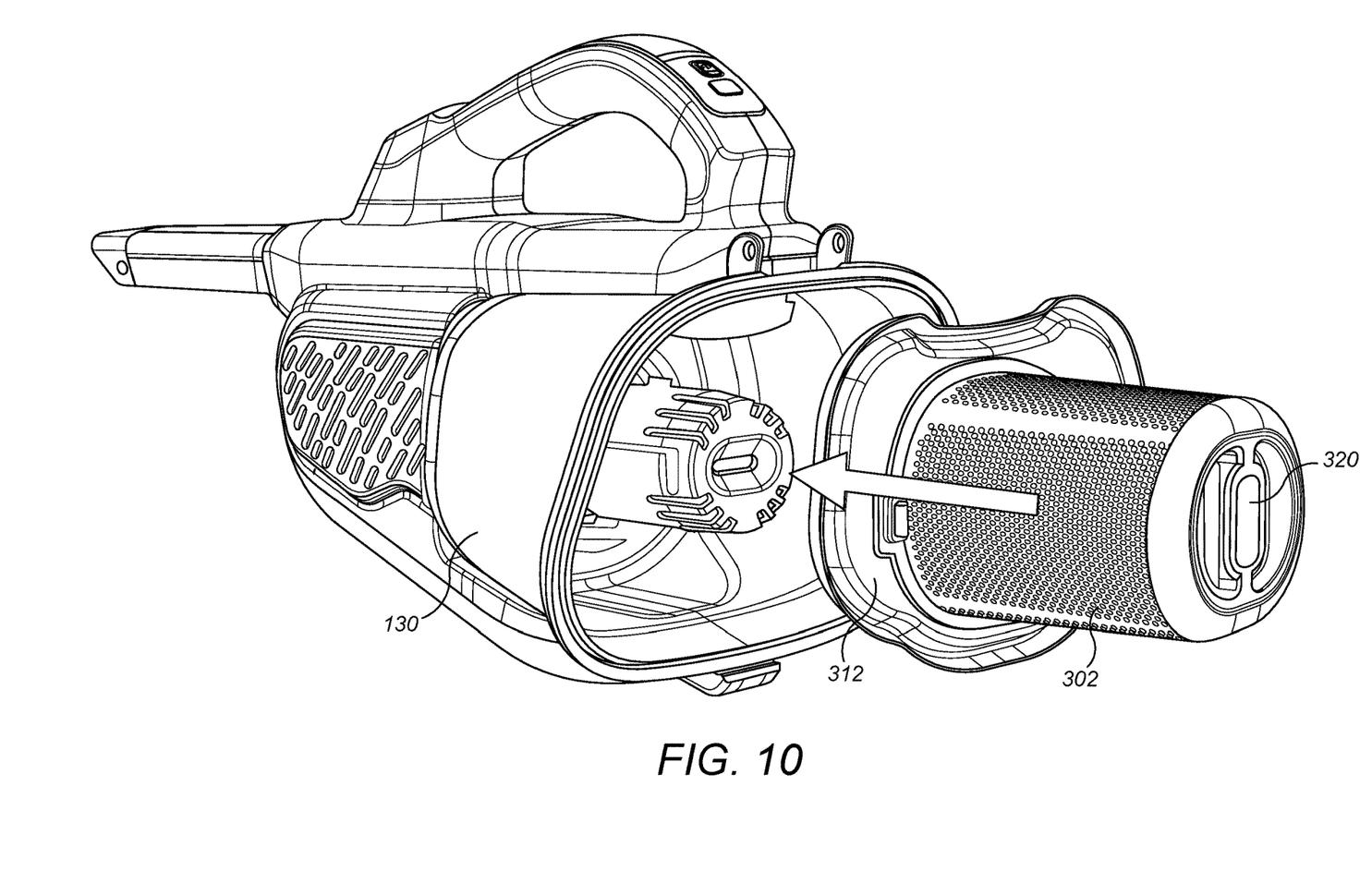
FIG. 10 shows a rear view of the vacuum cleaner and the filter assembly.

The fine filter medium of the fine filter 304 may be made from a flexible material, such as a fine mesh. The collar 312 and the gripping portion 330 may be made from a rigid material. As the fine filter medium is flexible, if the user grips the gripping portion 330 and pushes the fine filter 304 into the dirt container 130 so that it can couple with the dirt container 130 or housing 102, the flexible filter medium may collapse. This may cause the fine filter 304 to not properly couple with the dirt container or housing because the collapsing flexible filter reduces the pushing force at the coupling mechanism. To solve this problem, the coarse filter 302 is made from a rigid material. After cleaning the fine filter 304, the user attaches the coarse filter 302 to the fine filter 304 (as shown in FIG. 10) and grips the coarse filter gripping portion 320 to push both the fine and coarse filters into the dirt container 130 (as depicted by the arrow in FIG. 10). As the coarse filter 302 is rigid and is coupled to the rigid collar 312 of the fine filter 304, the pushing force applied to the coarse filter gripping portion 320 is transferred to the collar 312 and the coupling mechanism of the fine filter 330 to allow it to couple to the dirt container or housing.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

What is claimed is:

1. A vacuum cleaner comprising:
   a housing;
   a motor-fan assembly arranged to generate an airflow between an air inlet and an air outlet;
   a dirt collection chamber mounted to the housing and having a door; and
   a filter assembly located within the dirt collection chamber, the filter assembly comprising a coarse filter having a first gripping portion and a fine filter having a second gripping portion, wherein the first and second gripping portions are capable of being gripped by a user, wherein the first gripping portion and the second gripping portion are isolated from an airflow path between the air inlet and the air outlet.

2. The vacuum cleaner according to claim 1, wherein the first gripping portion is isolated from the airflow path by the door and the second gripping portion is isolated from the airflow path by the coarse filter.

3. The vacuum cleaner according to claim 1, wherein the first gripping portion is isolated from the airflow path upstream of the coarse filter by the door and the second gripping portion is isolated from the airflow path downstream of the coarse filter by the coarse filter.

4. The vacuum cleaner according to claim 1, wherein the fine filter comprises a collar located at an open end of the fine filter, wherein the collar is configured to push dirt out of the dirt collection chamber as the fine filter is pulled away from the dirt collection chamber.

5. The vacuum cleaner according to claim 1, wherein the coarse filter comprises a first coupling mechanism configured to removably attach the coarse filter to the fine filter.

6. The vacuum cleaner according to claim 5, wherein the first gripping portion is capable of being gripped by a user's fingers such that the user can pull the coarse filter so as to detach the coarse filter from the fine filter.

7. The vacuum cleaner according to claim 1, wherein the fine filter comprises a second coupling mechanism configured to removably attach the fine filter to the dirt collection chamber or the housing.

8. The vacuum cleaner according to claim 7, wherein the second gripping portion is capable of being gripped by a user's fingers such that the user can pull the fine filter so as to detach the fine filter from the dirt collection chamber or the housing.

9. The vacuum cleaner according to claim 7, wherein second coupling mechanism is configured such that the force required to detach the fine filter from the dirt collection chamber is greater than the force required to detach the coarse filter from the fine filter.

10. The vacuum cleaner according to claim 1, wherein door comprises a first sealing portion configured to seal the first gripping portion from the airflow path when the door is in a closed configuration.

11. The vacuum cleaner according to claim 10, wherein the first sealing potion projects from an interior face of the door.

12. The vacuum cleaner according to claim 1, wherein the coarse filter comprises a second sealing portion configured to seal the second gripping portion from the airflow path.

13. The vacuum cleaner according to claim 12, wherein the second sealing potion comprises a recess configured to receive the second gripping portion.

14. The vacuum cleaner according to claim 12, wherein the coarse filter has an open end and a closed end, wherein the closed end is impermeable by air, the second sealing portion being located at the closed end.

15. The vacuum cleaner according to claim 12, wherein the coarse filter has an open end and an opposite end comprising an opening, wherein the second sealing portion is configured to surround the opening.

16. The vacuum cleaner according to claim 1, wherein the coarse filter is rigid and the fine filter is flexible.

17. The vacuum cleaner according to claim 1, wherein the door is located at the rear of the vacuum cleaner.

18. The vacuum cleaner according to claim 1, wherein the coarse filter and the fine filter are hollow and shaped to be substantially cylindrical or a truncated cone.

19. The vacuum cleaner according to claim 1, wherein the fine filter surrounds at least a portion of the motor.

20. The vacuum cleaner according to claim 1, wherein the coarse filter surrounds at least a portion of the fine filter.

21. The vacuum cleaner according to claim 1, further comprising a battery removably mounted to the housing.

22. The vacuum cleaner according to claim 21 wherein the battery is a lithium ion battery.

23. The vacuum cleaner according to claim 1, wherein the motor-fan assembly comprises a brushless motor.

24. The vacuum cleaner according to claim 1, wherein the air inlet is engageable with a floor extension tube.

25. The vacuum cleaner according to claim 1, wherein:
the housing has a longitudinal axis;
the motor has a rotation axis; and
the filter assembly has a longitudinal axis, wherein the housing longitudinal axis, the motor rotation axis and the filter longitudinal axis are substantially parallel.

\* \* \* \* \*